(12) United States Patent
Sato et al.

(10) Patent No.: US 8,218,950 B2
(45) Date of Patent: Jul. 10, 2012

(54) RECORDING DEVICE AND RECORDING METHOD

(75) Inventors: Masahiro Sato, Ebina (JP); Kyotaro Tomoda, Ebina (JP); Shigehiko Sasaki, Ebina (JP); Tsutomu Ishii, Ebina (JP); Yasunori Saito, Ashigarakami-gun (JP)

(73) Assignee: Fuji Xerox Co., Ltd., Tokyo (JP)

( * ) Notice: Subject to any disclaimer, the term of this patent is extended or adjusted under 35 U.S.C. 154(b) by 704 days.

(21) Appl. No.: 12/364,131

(22) Filed: Feb. 2, 2009

(65) Prior Publication Data

US 2010/0067885 A1 Mar. 18, 2010

(30) Foreign Application Priority Data

Sep. 18, 2008 (JP) .................................. 2008-239242

(51) Int. Cl.
*H04N 5/84* (2006.01)

(52) U.S. Cl. .......................................... 386/334; 349/12

(58) Field of Classification Search ................... 386/200, 386/334
See application file for complete search history.

(56) References Cited

U.S. PATENT DOCUMENTS

| 5,555,115 A | 9/1996 | Mitsuoka et al. |
| 5,694,182 A | 12/1997 | Mitsuoka et al. |
| 7,619,600 B2 * | 11/2009 | Harada et al. .................. 345/87 |
| 2005/0162500 A1 * | 7/2005 | Nose et al. .................. 347/118 |
| 2007/0008262 A1 | 1/2007 | Harada et al. |
| 2008/0239174 A1 * | 10/2008 | Ishii et al. .................. 349/12 |

FOREIGN PATENT DOCUMENTS

| JP | A-5-93937 | 4/1993 |
| JP | A-06-044601 | 2/1994 |
| JP | A-09-091745 | 4/1997 |
| JP | A-2007-17461 | 1/2007 |
| JP | A-2007-33678 | 2/2007 |
| JP | A-2007-299016 | 11/2007 |

OTHER PUBLICATIONS

Japanese Office Action issued in Japanese Patent Application No. 2008-239242 dated Jun. 29, 2010 (with English translation).
Decision of Refusal for corresponding Japanese Patent Application No. 2008-239242, mailed on Nov. 30, 2010 (w/ English translation).

* cited by examiner

*Primary Examiner* — Huy T Nguyen

(74) *Attorney, Agent, or Firm* — Oliff & Berridge, PLC

(57) ABSTRACT

A recording device includes: a first irradiation unit that irradiates first light to an optical-recording-type display medium during a recording period on the basis of image data, the display medium being configured to display an image recorded in the display medium using light; and a second irradiation unit that irradiates second light having given energy to the display medium during the recording period.

5 Claims, 2 Drawing Sheets

RECORDING DEVICE AND RECORDING METHOD

CROSS-REFERENCE TO RELATED APPLICATIONS

This application is based on and claims priority under 35 USC 119 from Japanese Patent Application No. 2008-239242 filed on Sep. 18, 2008.

BACKGROUND

Technical Field

The present invention relates to a recording device and a recording method.

SUMMARY

An aspect of the present invention provides a recording device including: a first irradiation unit that irradiates first light to an optical-recording-type display medium during a recording period on the basis of image data, the display medium being configured to display an image recorded in the display medium using light; and a second irradiation unit that irradiates second light having given energy to the display medium during the recording period.

BRIEF DESCRIPTION OF THE DRAWINGS

Exemplary embodiments of the present invention will now be described in detail below with reference to the following figures, wherein.

DETAILED DESCRIPTION

An exemplary embodiment of the present invention will be described.

Figure 1:
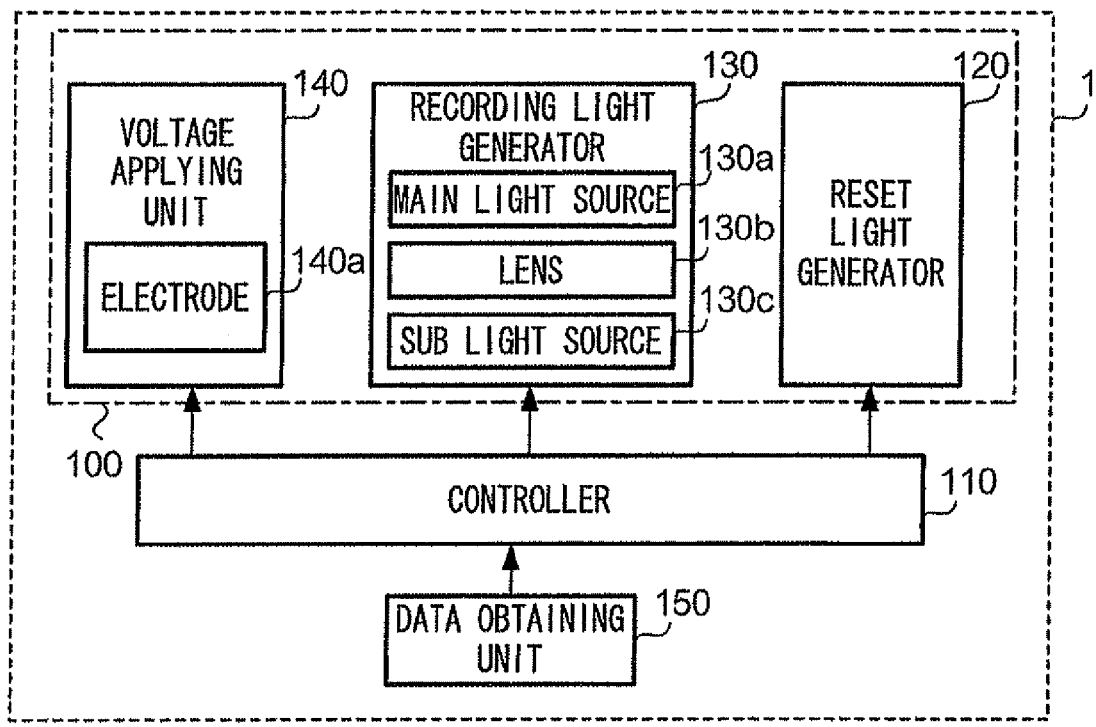
FIG. 1 is a block diagram illustrating a configuration of a recording device according to an exemplary embodiment.

FIG. 1 is a block diagram illustrating a configuration of recording device 1 according to an exemplary embodiment. Recording device 1 shown in the drawing is a device for recording or deleting an image in/from electronic paper 200 that is an optical-recording-type display medium, which includes recording unit 100, controller 110, and data obtaining unit 150. Recording unit 100 includes reset light generator 120, recording light generator 130, and voltage applying unit 140.

Figure 2:
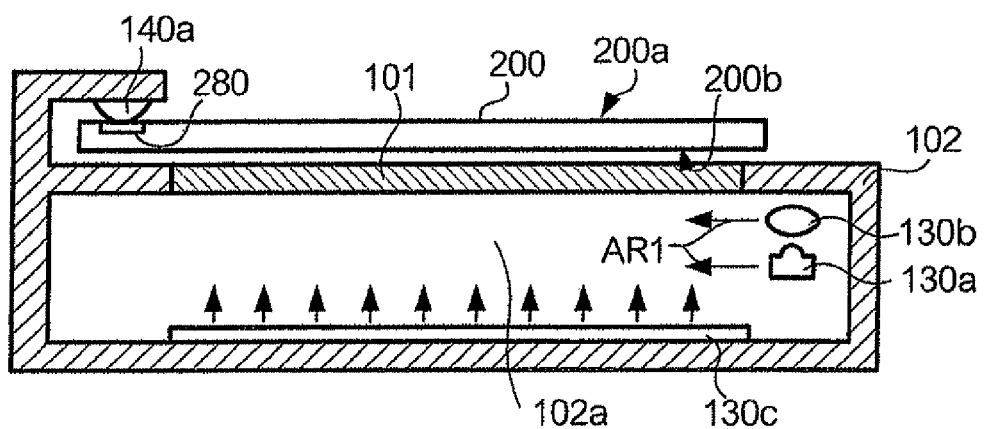
FIG. 2 is a diagram illustrating a configuration of a recording unit according to an exemplary embodiment.

FIG. 2 is a diagram illustrating a configuration of recording unit 100. Recording unit 100 holds or houses electronic paper 200 in a given manner so that light generated by reset light generator 120 or recording light generator 130 is irradiated to electronic paper 200. Hereinafter, each component of recording device 1 will be described with reference to FIGS. 1 and 2.

Controller 110 includes a processor such as a CPU (Central Processing Unit), which controls the operation of recording device 1. For example, controller 110 provides a control signal to reset light generator 120, recording light generator 130, and voltage applying unit 140 on the basis of data obtained by data obtaining unit 150, to control the components.

Data obtaining unit 150 obtains image data representing an image to be recorded in electronic paper 200. Data obtaining unit 150 may obtain image data from a storage unit such as an internal memory provided in recording device 1 or from outside recording device 1, for example, via a recording medium such as a non-volatile memory or wire/wireless communication. Data obtaining unit 150 may obtain an instruction from a user, input via an operation unit, whereby recording of an image starts.

Now, each component of recording unit 100 will be described. Case 102 is made of light shielding material, and houses reset light generator 120, recording light generator 130, and voltage applying unit 140. Case 102 holds electronic paper 200 to or from which an image is recorded or deleted. Inside case 102 is space 102a surrounded by case 102 and transparent plate 101 described later.

Transparent plate 101 is made of a translucent material, which defines a radiation area within which light generated inside case 102 is radiated to recording surface 200b of electronic paper 200 held by case 102. Since transparent plate 101 defines a radiation area, translucent material making up translucent plate 101 may be material that has a high light transmission and has less optical distortion. When electronic paper 200 is held by case 102, translucent plate 101 is covered by the electronic paper so that light is prevented from entering into case 102.

Reset light generator 120 generates light (reset light) for deleting an image recorded in electronic paper 200 before a new image is recorded in the electronic paper, using a light source (not shown) provided in space 102a. Reset light generator 120 may be an element that converts from electricity into light such as a LED (Light Emitting Diode), a cold-cathode tube, or an EL (Electro-Luminescence), which emits light at an intensity controlled by controller 110. As a light source of reset light generator 120, sub light source 130c described later may be used.

Recording light generator 130 includes main light source 130a, lens 130b, and sub light source 130c and generates light (recording light) for recording an image in electronic paper 200.

Main light source 130a may be a LED array that is plural LEDs arranged in a linear order, which is controlled by controller 110 to move in the direction of AR1. Blinking of each LED is controlled by controller 110. Main light source 130a emits light to recording surface 200b of electronic paper 200 within a radiation area, which is focused by lens 130b (described later) on a part of the surface, and traversed on the surface. Light emitted and traversed by main light source 130a may be, instead of linear arrayed light, a spotlight generated using a semiconductor laser.

Lens 130b may be a gradient index lens, which is provided for each LED constituting main light source 130a, and focuses light (recording light) generated by each LED within a range according to a resolution at which an image is recorded. Lens 130b is moved together with main light source 130a under control of controller 110. Lens 130b has an optical loss, thus absorbing a portion of light emitted from main light source 130a.

Sub light source 130c may be a light-emitting element with a surface-emitting face such as an EL or a plasma emitter, light emission from which is controlled by controller 110. Sub light source 130c irradiates light (sub light) generated from a light-emitting face to recording surface 200b of electronic paper 200 within a radiation area. A surface-emitting face of sub light source 130c may be formed by a point light-emitting element such as a light bulb or a LED, or a linear light-emitting element such as a cold-cathode tube, a fluorescent lighting tube, or a LED array, using a reflector, a light guide plate, or a diffuser plate.

Voltage applying unit 140 includes electrode 140a, which applies a voltage to electrode 140a under control of controller 110. When electronic paper 200 is held by recording unit 100, electrode 140a electrically contacts with electrode 280 (described later) of electronic paper 200 so that a voltage controlled by controller 110 is applied between transparent electrodes 220 and 260 of electronic paper 220.

The foregoing is a description of a configuration of recording device 1.

Figure 3:
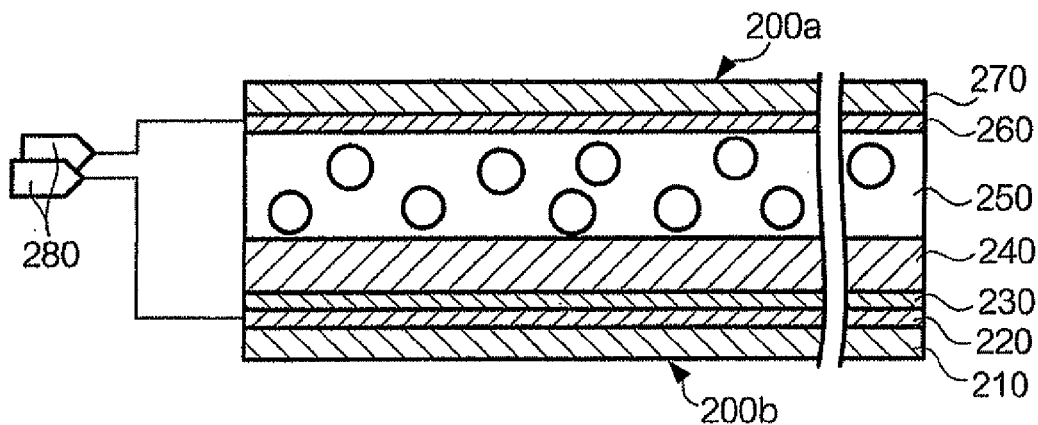
FIG. 3 is a diagram illustrating a configuration of an electronic paper according to an exemplary embodiment.

Now, a configuration of electronic paper 200 that is an optical-recording-type display medium will be described. FIG. 3 is a diagram illustrating a configuration of electronic paper 200. Electronic paper 200 includes, in a recording area for recording an image, film substrates 210 and 270, transparent electrodes 220 and 260, photoconductive layer 230, colored layer 240, and display element layer 250, and, outside the recording area, electrodes 280 each of which is connected to one of transparent electrodes 220 and 260.

Film substrates 210 and 270 are layers for protecting the surface of electronic paper 200, which may be made of PET (Polyethylene Terephthalate). Film substrate 210 has recording surface 200b to which reset light or recording light is irradiated. Film substrate 270 has display surface 200a on which a recorded image is viewed by a user. Transparent electrodes 220 and 260 each comprise a layer made of ITO (Indium Tin Oxide). Electrodes 280 connected to transparent electrodes 220 and 260 are connected with electrode 140a of recording device 1, as described above, and if a voltage is applied to electrode 140a under control of controller 110, a difference in potential is caused between transparent electrodes 220 and 260.

Photoconductive layer 230 is a layer made of a conductive material in which a conductivity changes according to an intensity of light irradiated. Photoconductive layer 230 may be an organic photo conductor. Colored layer 240 is a layer that can be viewed when display element layer 250 is transparent to light, which is in a given color (e.g., black).

Display element layer 250 is a layer including a display element whose reflectivity of light changes according to an applied voltage. In display element layer 250, microencapsulated cholesteric liquid crystal display elements are dispersed in binder resin. A cholesteric liquid crystal display element has two types of orientational state: a planar orientational state, and a focal conic orientational state. In a planar orientational state, a cholesteric liquid crystal display element reflects light (Bragg reflection), thus taking on a given color; whereas, in a focal conic orientational state, a cholesteric liquid crystal display element is transparent to light, as a result of which the color of colored layer 24 is visible.

To cause electronic paper 200 to record and display an image, a recording light is irradiated to recording surface 200b of electronic paper 200 while a given recording voltage is applied between transparent electrodes 220 and 260, and the application of the recording voltage is suspended. The irradiation of recording light to recording surface 200b changes conductivity of photoconductive layer 230, as described above. As a result, a voltage applied to display element layer 250 changes, which changes reflectivity of light of display elements; and accordingly, reflectivity of display surface 200a changes.

Figure 4:
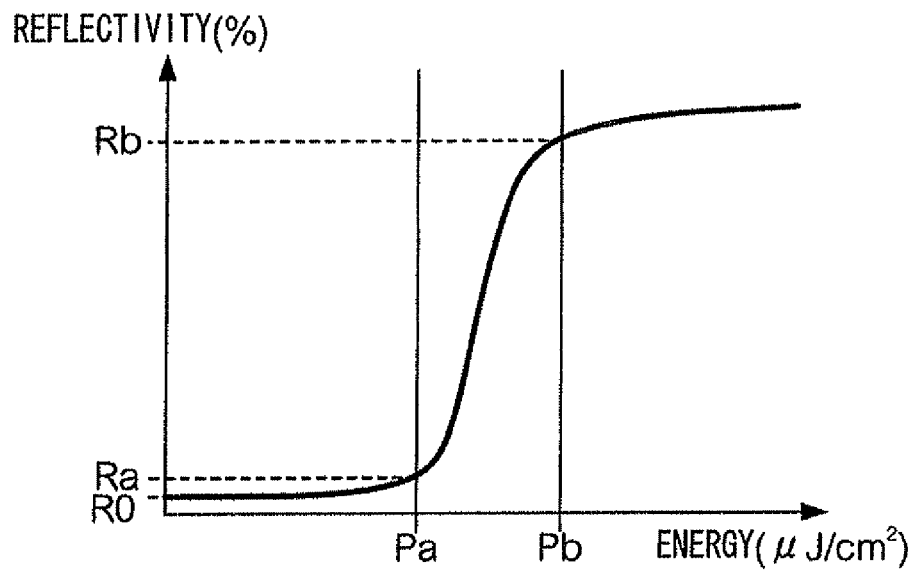
FIG. 4 is a diagram illustrating a display property of an electronic paper according to an exemplary embodiment.

FIG. 4 is a diagram illustrating a relation between a total amount of energy of light irradiated per unit area (hereinafter, simply referred to as "energy"), the light being irradiated to recording surface 200b of electronic paper 200 during a given recording period while a recording voltage is applied to electronic paper 200, and reflectivity. The horizontal axis is a scale of the energy of light irradiated to recording surface 200b, which is expressed as a logarithmic axis, and the vertical axis is a scale of the reflectivity of display surface 200a. As shown in FIG. 4, before light is irradiated, reflectivity is R0, and as energy of irradiated light increases, reflectivity increases. Also, a rate of change of reflectivity with respect to change of energy of irradiated light in a certain energy range is larger than that of the other energy area.

The certain energy range is an energy range of Pa to Pb shown in FIG. 4, in which reflectivity changes from Ra to Rb. Accordingly, a rate of change of reflectivity is less than or equal to (Ra−R0) until energy of irradiated light reaches Pa; which rate is less than that of the certain energy range. Energy needed to record an image in electronic paper 200 is equal to or greater than Pa. It is to be noted that if gradation expression is not necessary to record an image, energy of light to be irradiated may be set to be equal to or greater than Pb.

To delete an image recorded in electronic paper 200 and initialize the electronic paper, reset light is irradiated to recording surface 200b while a given reset voltage is applied between transparent electrodes 220 and 260, and thereafter the application of the reset voltage is suspended. An initialization of electronic paper 200 is performed before an image is recorded in the electronic paper. The foregoing is a description of a configuration of electronic paper 200.

Now, an operation of recording device 1 will be described. In the following description, it is assumed that electronic paper 200 is held by case 102 of recording device 1 so that recording surface 200b of electronic paper 200 faces transparent plate 101 of recording unit 100, and electrodes 280 and electrode 140a are connected with each other, and that recording device 1 is ready for initialization and recording of an image.

If data obtaining unit 150 obtains image data representing an image to be recorded in electronic paper 200, and further receives an instruction to record the image in electronic paper 200, electronic paper 200 is initialized, and thereafter an operation of recording the image in electronic paper 200 is started.

In the initialization process, controller 110 causes voltage applying unit 140 to apply a reset voltage to electronic paper 200 via electrode 140a. Subsequently, while a reset voltage is applied to electronic paper 200, controller 110 causes reset light generator 120 to irradiate light so that the total amount of light irradiated to a radiation area during a given time period reaches a given value. Finally, controller 110 causes reset light generator 120 to stop the irradiation of reset light, and causes voltage applying unit 140 to stop the application of a reset voltage.

In the operation of recording the image in electronic paper 200, controller 110 causes voltage applying unit 140 to generate and apply a recording voltage to electronic paper 200 via electrode 140a. Subsequently, while a recording voltage is applied to electronic paper 200, controller 110 causes sub light source 130c to irradiate sub light to recording surface 200b of electronic paper 200. When doing so, controller 110 controls the intensity and the irradiation time of the sub light so that energy of the sub light irradiated during a given recording period amounts to a given value which is less than or equal to Pa, in other words, so that the rate of change of reflectivity is less than or equal to a given value, (Ra−R0). The given value may be, instead of (Ra−R0), other values such as (R0+1 percent).

Controller 110 also causes main light source 130a to irradiate recording light to recording surface 200b of electronic paper 200. When doing so, controller 110 controls the intensity of the recording light and moving speed of main light source 130a so that the total energy of the sub light irradiated from sub light source 130c and energy of the recording light irradiated from main light source 130a corresponds to reflectivity according to image data obtained by data obtaining unit 150, to store an image represented by the image data in electronic paper 200.

It is to be noted that it is not necessary to irradiate recording light and sub light during an entire recording period. Recording light and sub light may be irradiated during only a part of a recording period. Also, it is not necessary to simultaneously irradiate recording light and sub light. Either recording light or sub light may be irradiated in advance. In essence, it is only necessary to have light irradiated to recording surface 200b of electronic paper 200 during a recording period, which corresponds to reflectivity according to image data.

As described above, according to the present exemplary embodiment, sub light irradiated from sub light source 130c, which does not pass through lens 130b having an optical loss, and recording light irradiated from main light source 130a, which passes through lens 130b, are combined to generate light for recording an image in electronic paper 200. Accordingly, as compared with a case in which sub light is not used, the amount of light loss resulting from lens 130b is smaller, and therefore less electricity is needed to record an image in electronic paper 200.

After recording light and sub light are irradiated, controller 110 causes voltage applying unit 140 to stop the application of a recording voltage. With this step, the operation of recording the image in electronic paper 200 ends. The foregoing is a description of an operation of recording device 1.

The exemplary embodiment of the present invention described above may be modified as described below.
<Modification 1>

Figure 5:
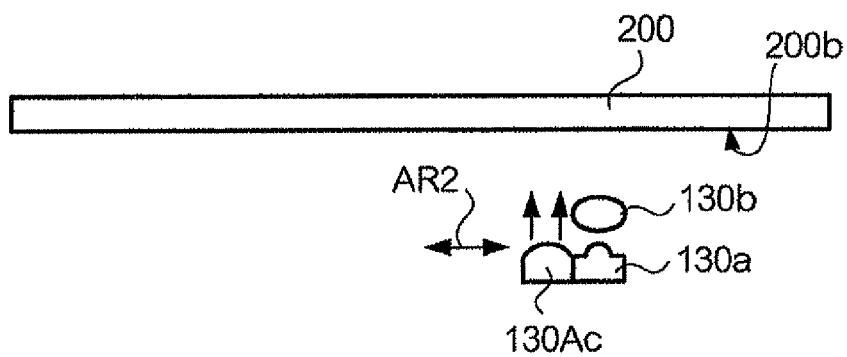
FIG. 5 is a diagram illustrating a configuration of a recording unit according to modification 1.

In the above exemplary embodiment, where a light-emitting element with a surface-emitting face is used as sub light source 130c, a light-emitting element with a linear emitting surface that irradiates sub light to a part of recording surface 200b of electronic paper 200 such as a LED array or a cold-cathode tube may be used as sub light source 130Ac, as shown in FIG. 5.

If sub light source 130Ac is used, sub light irradiated by sub light source 130Ac is controlled by controller 110 so as to traverse the entire recording surface 200b of electronic paper 200. More specifically, controller 110, while a recording voltage is applied to electronic paper 200, controls the intensity of sub light source 130Ac and moving speed of sub light source 130Ac in the direction of arrow A2 so that energy of sub light irradiated during a given recording period amounts to a given value which is equal to or less than Pa. In this case, controller 110 may cause sub light source 130Ac to move together with main source light 130a. Alternatively, controller 110 may cause sub light source 130Ac to move independently from main source light 130a. A moving method of sub light source 130Ac may be determined on the basis of emission intensity and radiation range of sub light source 130Ac.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A recording device comprising:
a first irradiation unit that irradiates first light to an optical-recording-type display medium during a recording period on the basis of image data, the display medium being configured to display an image recorded in the display medium using light; and
a second irradiation unit that irradiates second light having given energy to the display medium during the recording period for recording the image data.

2. The recording device according to claim 1, wherein:
the display medium is further configured to display an image due to change of reflectivity of an area of the display medium subjected to light, the change of reflectivity being dependent on energy of the light irradiated during the recording period; and
the given energy of the second light irradiated by the second irradiation unit during the recording period is preset so that if the first light is not irradiated to the display medium by the first irradiation unit, and the second light is irradiated to display medium by the second irradiation unit, an amount of change of reflectivity of an area of the display medium subjected to the second light is less than or equal to a given value.

3. The recording device according to claim 1, wherein:
the first irradiation unit irradiates the first light having a given radiation range to the display medium while changing an irradiation direction of the first light; and
a radiation range of the second light irradiated by the second irradiation unit includes an entire area of the display medium to which the first light is irradiated by the first irradiation unit.

4. A recording device comprising:
a first irradiation means for irradiating first light to an optical-recording-type display medium during a recording period on the basis of image data, the display medium being configured to display an image recorded in the display medium using light; and
a second irradiation means for irradiating second light having given energy to the display medium during the recording period for recording the image data.

5. A recording method comprising:
irradiating first light to an optical-recording-type display medium during a recording period on the basis of image data, the display medium being configured to display an image recorded in the display medium using light; and
irradiating second light having given energy to the display medium during the recording period for recording the image data.

* * * * *